(12) United States Patent
Sakata et al.

(10) Patent No.: US 11,982,745 B2
(45) Date of Patent: May 14, 2024

(54) OBJECT RECOGNIZING DEVICE

(71) Applicant: Hitachi Automotive Systems, Ltd., Hitachinaka (JP)

(72) Inventors: Kosuke Sakata, Hitachinaka (JP); Masayoshi Kuroda, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 919 days.

(21) Appl. No.: 16/978,994

(22) PCT Filed: Mar. 6, 2019

(86) PCT No.: PCT/JP2019/008759
§ 371 (c)(1),
(2) Date: Sep. 8, 2020

(87) PCT Pub. No.: WO2019/181491
PCT Pub. Date: Sep. 26, 2019

(65) Prior Publication Data
US 2021/0364638 A1 Nov. 25, 2021

(30) Foreign Application Priority Data
Mar. 22, 2018 (JP) .................. 2018-054577

(51) Int. Cl.
*G01S 17/42* (2006.01)
*G01S 7/48* (2006.01)
*G01S 17/66* (2006.01)
*G01S 17/89* (2020.01)
*G01S 17/931* (2020.01)

(52) U.S. Cl.
CPC ............ *G01S 17/42* (2013.01); *G01S 7/4808* (2013.01); *G01S 17/66* (2013.01); *G01S 17/89* (2013.01); *G01S 17/931* (2020.01)

(58) Field of Classification Search
CPC ........ G01S 7/40; G01S 7/4808; G01S 7/4861; G01S 7/487; G01S 7/4876; G01S 17/04;
(Continued)

(56) References Cited

U.S. PATENT DOCUMENTS 10,049,335 B1 * 8/2018 Narkier ............. G06Q 10/0637
2005/0068198 A1 3/2005 Brega et al.
(Continued)

FOREIGN PATENT DOCUMENTS

DE 102011087751 A1 * 6/2012 ............. G01S 17/10
JP 2000-199789 A 7/2000
(Continued)

OTHER PUBLICATIONS

International Search Report with English translation and Written Opinion issued in corresponding application No. PCT/JP2019/008759 dated Jun. 18, 2019.
(Continued)

*Primary Examiner* — Yuqing Xiao
*Assistant Examiner* — Benjamin Richard Hebert
(74) *Attorney, Agent, or Firm* — Foley & Lardner LLP

(57) ABSTRACT

Noise in measurement results of a laser distance measurement sensor is smoothed, and erroneous recognition of a position and a size of an object based on the measurement result is suppressed. An object recognition device according to the present invention recognizes the object by grouping the measurement results of the laser distance measurement sensor, calculates reliability of the recognition result thereof, and changes a time for continuously retaining the measurement result according to the reliability.

11 Claims, 8 Drawing Sheets

(58) Field of Classification Search
CPC .......... G01S 17/06; G01S 17/42; G01S 17/66;
G01S 17/89; G01S 17/931
See application file for complete search history.

(56) References Cited

U.S. PATENT DOCUMENTS

| | | | | |
|---|---|---|---|---|
| 2008/0019567 A1* | 1/2008 | Takagi | .................... | G06V 20/58 |
| | | | | 382/103 |
| 2013/0332112 A1 | 12/2013 | Nakamura | | |
| 2014/0003671 A1 | 1/2014 | Matsubara | | |
| 2015/0109164 A1* | 4/2015 | Takaki | .................. | G01S 13/931 |
| | | | | 342/27 |
| 2016/0132056 A1* | 5/2016 | Yoshino | ............... | G05D 1/0274 |
| | | | | 701/23 |
| 2016/0161607 A1* | 6/2016 | Turner | .................. | G01S 13/726 |
| | | | | 342/146 |

FOREIGN PATENT DOCUMENTS

| | | | |
|---|---|---|---|
| JP | 2012-233890 A | | 11/2012 |
| JP | 2017134514 A | * | 8/2017 |
| JP | 2017-166971 A | | 9/2017 |
| JP | 2019-003558 A | | 1/2019 |
| WO | WO-2012/117528 A1 | | 9/2012 |

OTHER PUBLICATIONS

Extended European Search Report issued in corresponding European Application No. 19770435.6 dated Nov. 22, 2021.

* cited by examiner

OBJECT RECOGNIZING DEVICE

TECHNICAL FIELD

The present invention relates to an object recognition device that recognizes an object by using measurement results obtained by a laser distance measurement sensor.

BACKGROUND ART

In the related art, there is a technology of estimating a position and a size of a peripheral object by using measurement results of a laser distance measurement sensor. For example, when the position and size of the object such as another vehicle present in front of a vehicle are estimated, the laser distance measurement sensor can be used.

The following PTL 1 describes a technology of detecting an object around a vehicle with a laser sensor. PTL 1 has an object to provide "an object detection device and an object detection program capable of improving detection accuracy of even a black object having a low reflectance present on a road", and discloses a technology in which "a control device acquires distance information in front of a host vehicle by a three-dimensional distance detection unit such as a laser radar (S2), and maps the acquired distance information to a bird's-eye view grid (S3). The control device detects a cell in which a three-dimensional object is present from point group information (S4 and S5), and detects a road surface for a closer cell than the cell (S6 and S7). The control device calculates an estimated three-dimensional object for a pointless cell by Expression (A) (S8 and S9), and sets an estimated weight (S10). The control device converts data of the bird's-eye view grid into a stationary grid (S11), and adds a three-dimensional object probability by performing the same processing after the movement of the host vehicle (S12). Accordingly, even though the cell is the pointless cell, when the three-dimensional object probability increases, it is possible to determine that the three-dimensional object is present" (see ABSTRACT).

The following PTL 2 describes a technology of recognizing the presence of a person. PTL 2 has an object to provide "a presence and absence management system capable of accurately determining presence or absence of the person in a management target region", and discloses a technology in which "a presence and absence management system 1 is a system that manages the presence or absence of the person in the management target region, and includes a person detection sensor 10 that detects the presence or absence of the person in each of a plurality of predetermined detection regions of the management target region, and a calculation unit 11a that calculates a person presence probability in each of a plurality of calculation regions which is set in the management target region and is set as regions different from the plurality of detection regions based on a detection result of each of the plurality of detection regions by the person detection sensor 10" (see ABSTRACT).

CITATION LIST

Patent Literature

PTL 1: JP 2017-166971 A
PTL 2: JP 2012-233890 A

SUMMARY OF INVENTION

Technical Problem

As described in PTL 1, a method of recognizing the object by associating the measurement results of the laser distance measurement sensor with grids may be called an occupancy grid map. The position and size of the object can be recognized by grouping the measurement results close to each other on the grids.

In the occupancy grid map, the noise included in the measurement results may be smoothed when the measurement results are associated with the grids. Specifically, the measurement results associated with the grids are retained continuously for a predetermined time. Accordingly, the influence of instantaneous noise can be suppressed. However, in this case, there is a possibility that a size different from a true size of the object is recognized.

In PTL 2, since the person detection sensor 10 detects the presence of the person by detecting the movement of the person, it is difficult to detect the presence of the person when the person does not move. Thus, in PTL 2, a probability that the person is present is reduced with the passage of time. Accordingly, even though the person does not move, since the presence probability remains to some extent, it is possible to consider a possibility that the person remains at this location. In PTL 2, in an area where the presence probability is continuously equal to or greater than a predetermined value, the presence probability is not sharply reduced even though time passes. Accordingly, it is considered that the presence of the person can be reliably detected even when the person does not move.

In the occupancy grid map, it is considered that it is necessary to adjust a time for which the grid retains the measurement result in order to eliminate erroneous recognition caused by the grid that retains the measurement result continuously for the predetermined time. For example, as described in PTL 2, for the grid in which a probability that the object is present is equal to or greater than a predetermined value, it is considered that a change rate in the presence probability is set to be different from change rates of other grids.

The occupancy grid map is a method of recognizing the object by grouping the measurement results close to each other, and the measurement results belonging to the same group represent the same object. Thus, when a part of the grids belonging to the same group represents presence probabilities different from the probabilities of other grids, since the probability that the object is present is different for each part of the object, there is a possibility that the object recognition does not work properly. In other words, since the technology described in PTL 2 does not recognize the object by grouping the measurement results, it is difficult to apply the measurement results to the occupancy grid map based on this assumption.

The present invention has been made in view of the above-described problems, and an object of the present invention is to smooth noise of measurement results of a laser distance measurement sensor and suppress erroneous recognition of a position and a size of an object based on the measurement results.

Solution to Problem

An object recognition device according to the present invention recognizes an object by grouping measurement results of a laser distance measurement sensor, calculates reliability of the recognition result thereof, and changes a time for continuously retaining the measurement result according to the reliability.

Advantageous Effects of Invention

In accordance with the object recognition device according to the present invention, when the object is recognized by grouping the measurement results of the laser distance measurement sensor, noise of the measurement results can be smoothed, and the erroneous recognition of the position and size of the object based on the measurement results can be suppressed.

DESCRIPTION OF EMBODIMENTS

<Principle and Problem of Object Recognition of Laser Distance Measurement Sensor>

In order to facilitate understanding of the present invention, first, a basic principle of recognizing a position and a size of an object by using measurement results of a laser distance measurement sensor will be described, and a problem thereof will be described. Embodiments of the present invention will be described.

Figure 1:
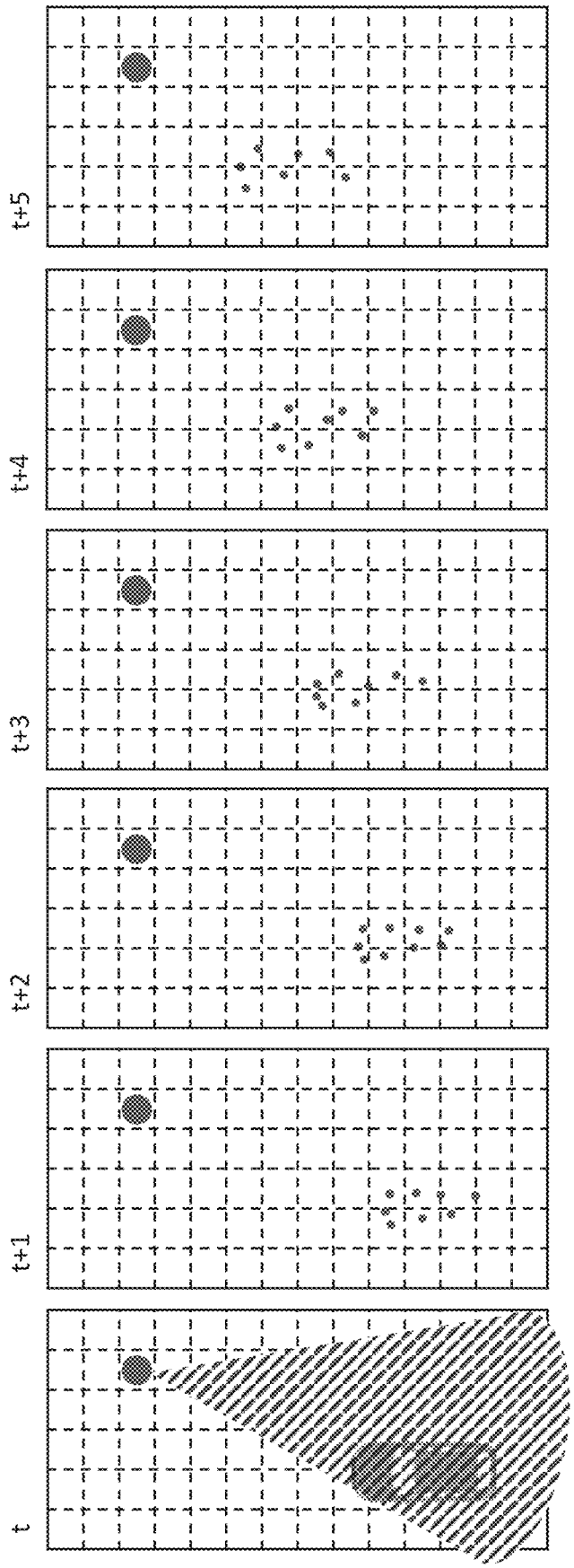
FIG. 1 is a conceptual diagram illustrating measurement results obtained of a laser distance measurement sensor.

FIG. 1 is a conceptual diagram illustrating the measurement results obtained by the laser distance measurement sensor. When a laser beam is emitted from the laser distance measurement sensor to the object (vehicle in FIG. 1), the laser beam is reflected from the object. The laser distance measurement sensor can measure a distance from the laser distance measurement sensor to a reflection point and a direction from the laser distance measurement sensor to the reflection point by detecting the reflected light. For example, it is possible to estimate temporal changes in the position and size of the object by performing the measurement at every predetermined period.

Figure 2:
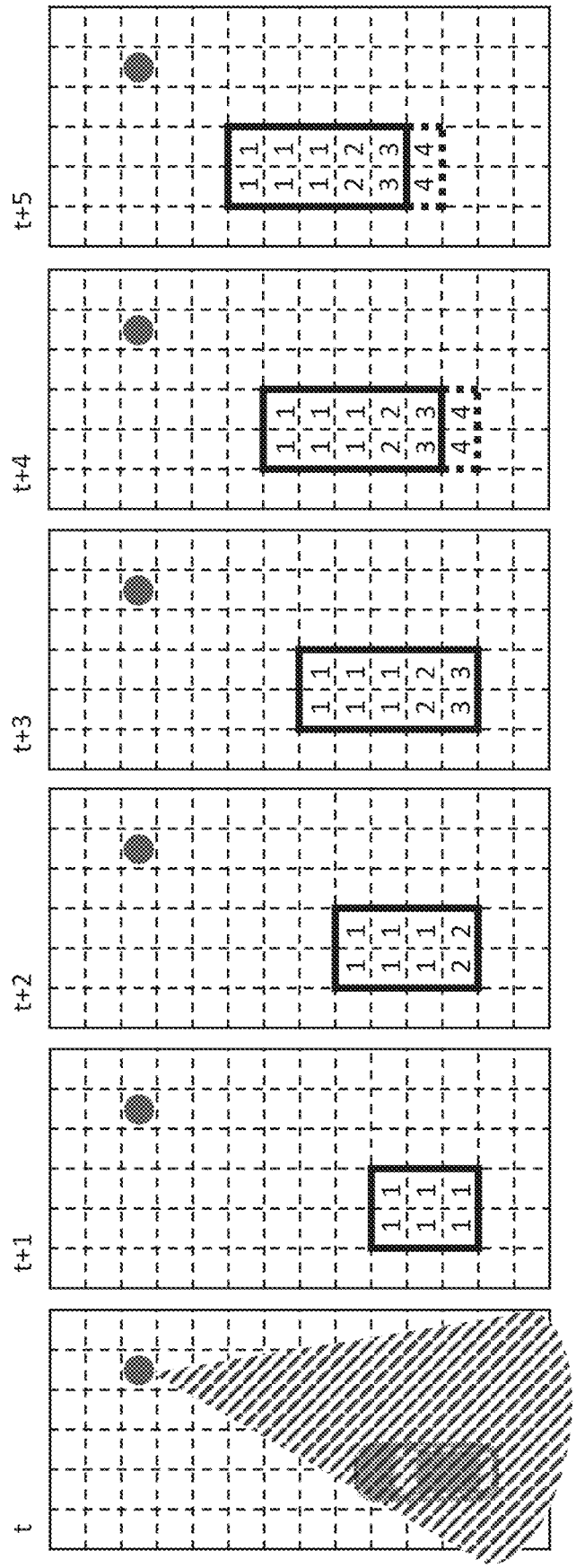
FIG. 2 is a diagram illustrating a result obtained by grouping measurement results of the laser distance measurement sensor.

FIG. 2 is a diagram illustrating a result obtained by grouping the measurement results of the laser distance measurement sensor. The measurement results of the laser distance measurement sensor are associated with grids in a coordinate space, and thus, the grids retain the measurement results. The measurement results close to each other are grouped, and thus, it is possible to form grid regions as illustrated by thick lines of FIG. 2. It is assumed that the object is present within the grid region surrounded by the thick line, and thus, the position and size of the object can be estimated.

The measurement results obtained by the laser distance measurement sensor may often contain a lot of noise. This is because when the laser beam is reflected from the object, the reflection is not uniform. When such a measurement result is directly associated with the grid, the measurement result changes greatly with time, and is not stable. Thus, in an occupancy grid map, in general, the grids retain the measurement results continuously for a predetermined time after the measurement results are associated with the grids. That is, even though the measurement results are not associated with the grids at the next time, the measurement results are retained until the predetermined time elapses. Accordingly, it is possible to smooth the noise of the measurement results.

Numbers in the grids of FIG. 2 represent times when the grids retain the measurement results as the generations of the grids. After 2×3 grids are grouped as the object at time t+1, since the object advances in an up direction of FIG. 2, a grid group also advances in the same direction with the passage of time. Originally, it is desirable that the 2×3 grids move as it is, but the grids to which the measurement results are once assigned retain the measurement results continuously for the predetermined time in order to achieve the smoothing. Here, it has been described that the measurement results are retained for three time units.

For example, at time t+2, lower two grids of the grids surrounded by thick line are the grids to which the measurement results are assigned at time t+1. These measurement results are also retained at time t+3. At time t+4, the measurement results of these two grids are discarded. Similarly, the measurement results are retained or discarded for other grids.

As a result of smoothing the noise as described above, recognition results of 2×3 grids at time t+1 are recognition results of 2×5 grids after time t+3. Thus, the object larger than the original size of the object is recognized. According to the present invention, it is possible to suppress such erroneous recognition.

First Embodiment

Figure 3:
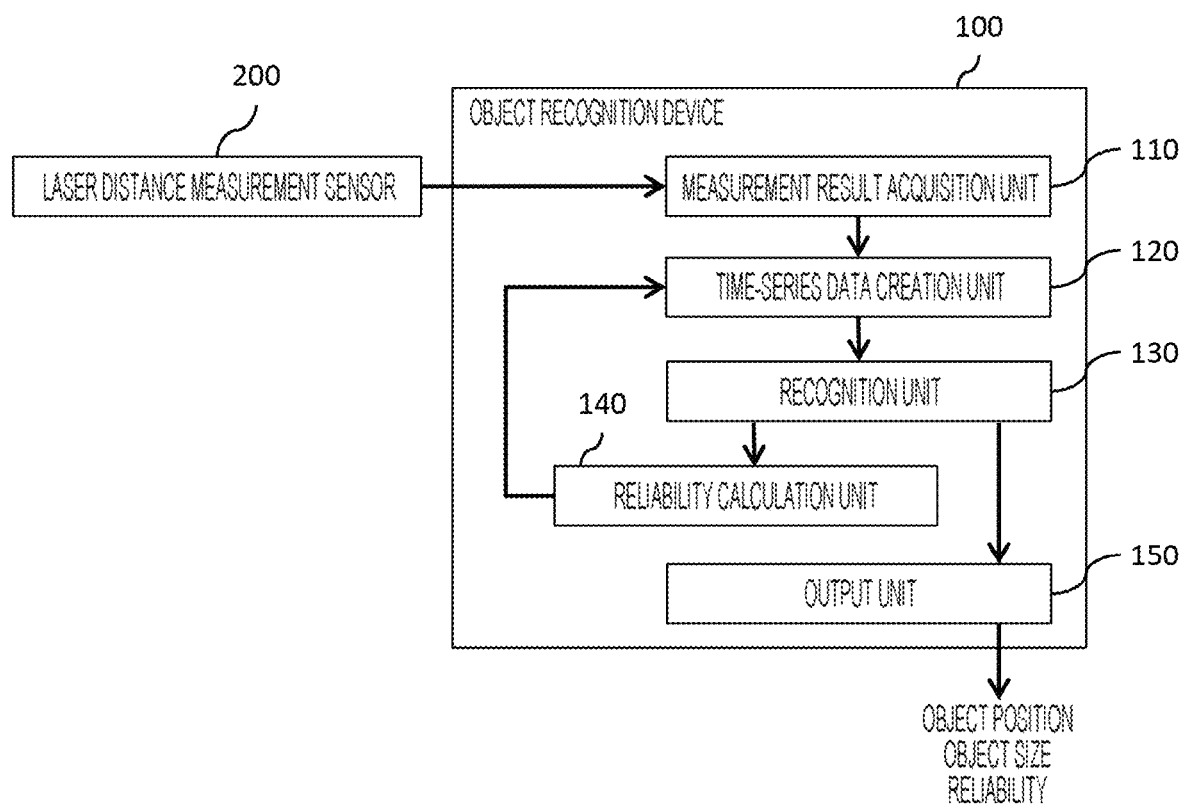
FIG. 3 is a configuration diagram of an object recognition device 100 according to a first embodiment.

FIG. 3 is a configuration diagram of an object recognition device 100 according to a first embodiment of the present invention. The object recognition device 100 is a device that recognizes the position and size of the object by using the measurement results of the laser distance measurement sensor 200. The object recognition device 100 includes a measurement result acquisition unit 110, a time-series data creation unit 120, a recognition unit 130, a reliability calculation unit 140, and an output unit 150.

The measurement result acquisition unit 110 acquires the measurement results of the laser distance measurement sensor 200. The time-series data creation unit 120 creates the occupancy grid map for each measurement time by using the measurement results. The recognition unit 130 recognizes the position and size of the object by grouping the measurement results close to each other on the grids. The reliability calculation unit 140 calculates reliability of the position and size of the object recognized by the recognition unit 130. A specific example of the reliability and the purpose thereof will be described later. The output unit 150 outputs the recognition result and the reliability.

Figure 4:
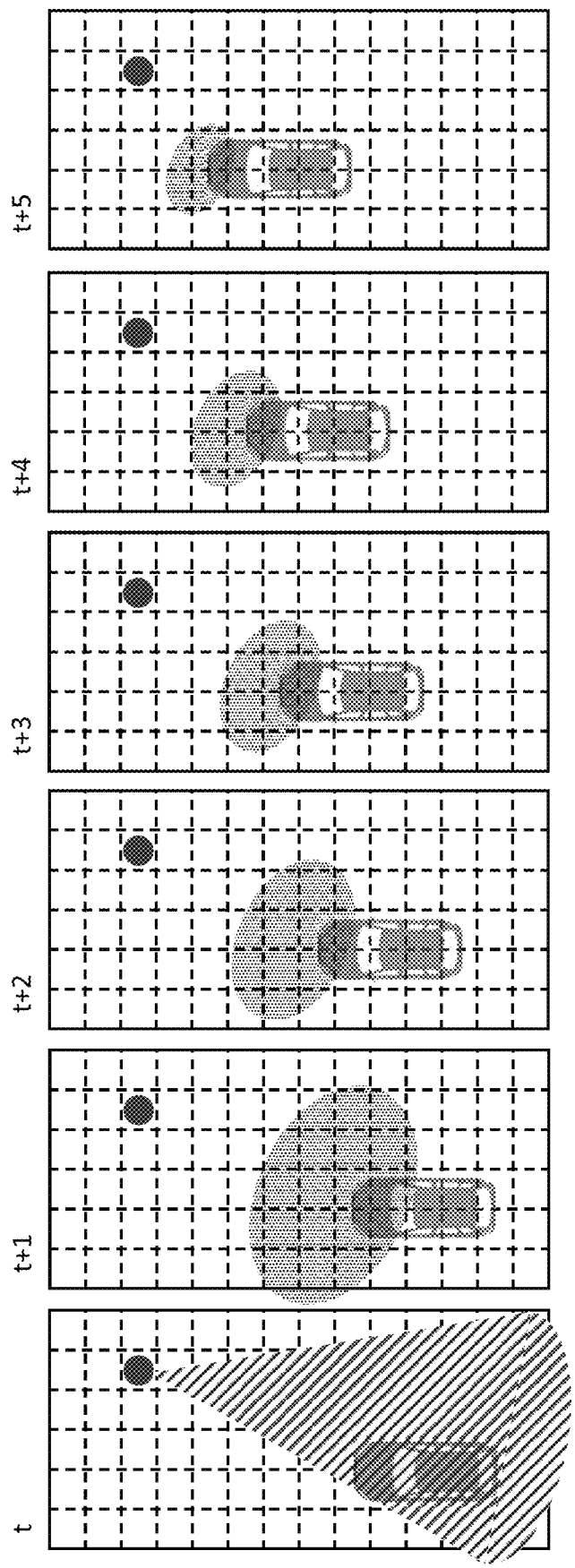
FIG. 4 is a schematic diagram illustrating a temporal change in reliability.

FIG. 4 is a schematic diagram illustrating a temporal change in reliability. The recognition unit 130 recognizes the position and size of the object based on a result obtained by grouping the measurement results. For example, a Kalman filter can be used as a method used at this time. The Kalman filter is to obtain the final recognition result by combining the following two types of recognition results: (a) a recognition result at the next time is calculated by adding input values (for example, a speed and an acceleration of the vehicle) to a recognition result at the previous time; and (b) the recognition result is obtained by using the measurement result itself. For example, the measurement results close to each other are grouped.

When the recognition unit 130 recognizes the position and size of the object by using the Kalman filter, the recognition result has variance over a certain range. This variance value tends to decrease with the passage of time. This is because recognition accuracy is improved because the measurement results are accumulated with the passage of time. An ellipse of FIG. 4 schematically represents this variance value. The reliability calculation unit 140 can calculate this variance value as the reliability of the recognition result of the recognition unit 130.

When the recognition result of the recognition unit 130 is sufficiently reliable, it is not necessary to consider the influence of the noise included in the measurement result of the laser distance measurement sensor 200. Thus, the time-series data creation unit 120 shortens a time for which the grid retains the measurement result as the reliability of the recognition result increases. Specifically, the measurement result is discarded before a time set in advance as a time when the grid is to retain the measurement result.

Figure 5:
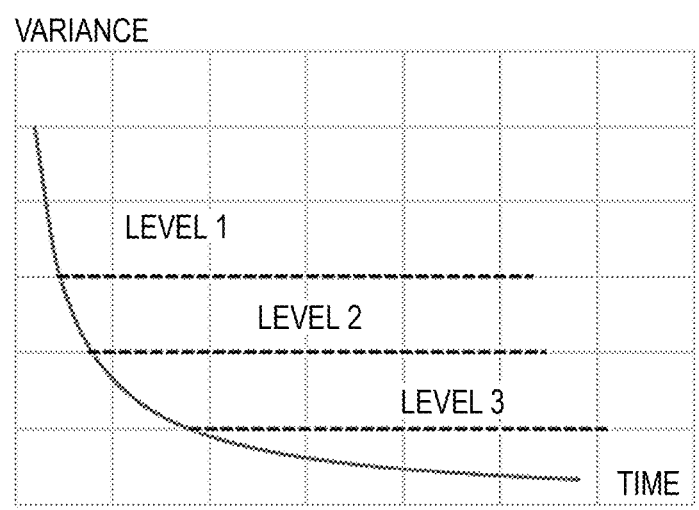
FIG. 5 is a graph illustrating a relationship between variance of a recognition result of a recognition unit 130 and reliability.

FIG. 5 is a graph illustrating a relationship between the variance of the recognition result of the recognition unit 130 and the reliability. The reliability of the recognition result of the recognition unit 130 is improved with the passage of time. For example, a threshold value may be set for the variance value, and a reliability level may be increased by one level whenever the variance value is less than the threshold value. Here, an example in which the reliability level is divided into four levels is illustrated.

Figure 6:
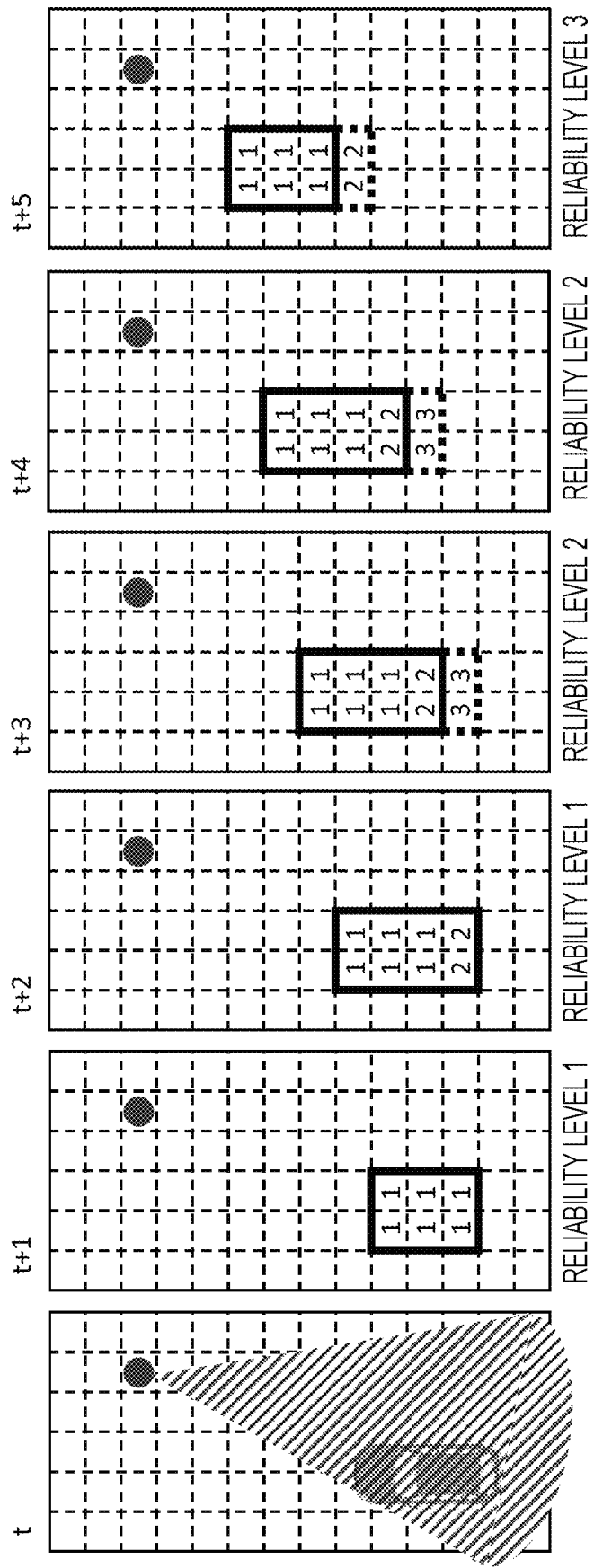
FIG. 6 is a diagram illustrating an example in which a time for which a grid retains a measurement result is changed according to a reliability level of the recognition result of the recognition unit 130.

FIG. 6 is a diagram illustrating an example in which the time for which the grid retains the measurement result is changed according to the reliability level of the recognition result by the recognition unit 130. Here, it is assumed that the reliability level at time t+1 and t+2 is 1, the reliability level at time t+3 and t+4 is 2, and the reliability level at time t+5 is 3.

When the reliability level is 1, the grids retain the measurement results for three time units. Thus, at time t+2, 2×4 grids are grouped. When the reliability level is 2, the grids retain the measurement results for two time units. Thus, at times t+3 to t+4, the measurement results retained for three time units among the grids belonging to the group are discarded. When the reliability level is 3, the grids retain the measurement results only for one time unit. Thus, at time t+5, the measurement results retained for two time units among the grids belonging to the group are discarded.

Through the above procedure, since the same 2×3 grids as the grids at time t+1 are recognized as a range in which the object is present at time t+5, the object can be suppressed from being erroneously recognized as being larger than the original size of the object. Since the measurement result is discarded at a stage at which the reliability of the recognition result is sufficiently improved, the influence of the noise included in the measurement result of the laser distance measurement sensor 200 can be suppressed.

The grid for which the time for retaining the measurement result is changed is only the grid that recognizes the object by grouping the measurement results. This is because there is a possibility that another object with a different reliability level is present in the other grid.

Figure 7:
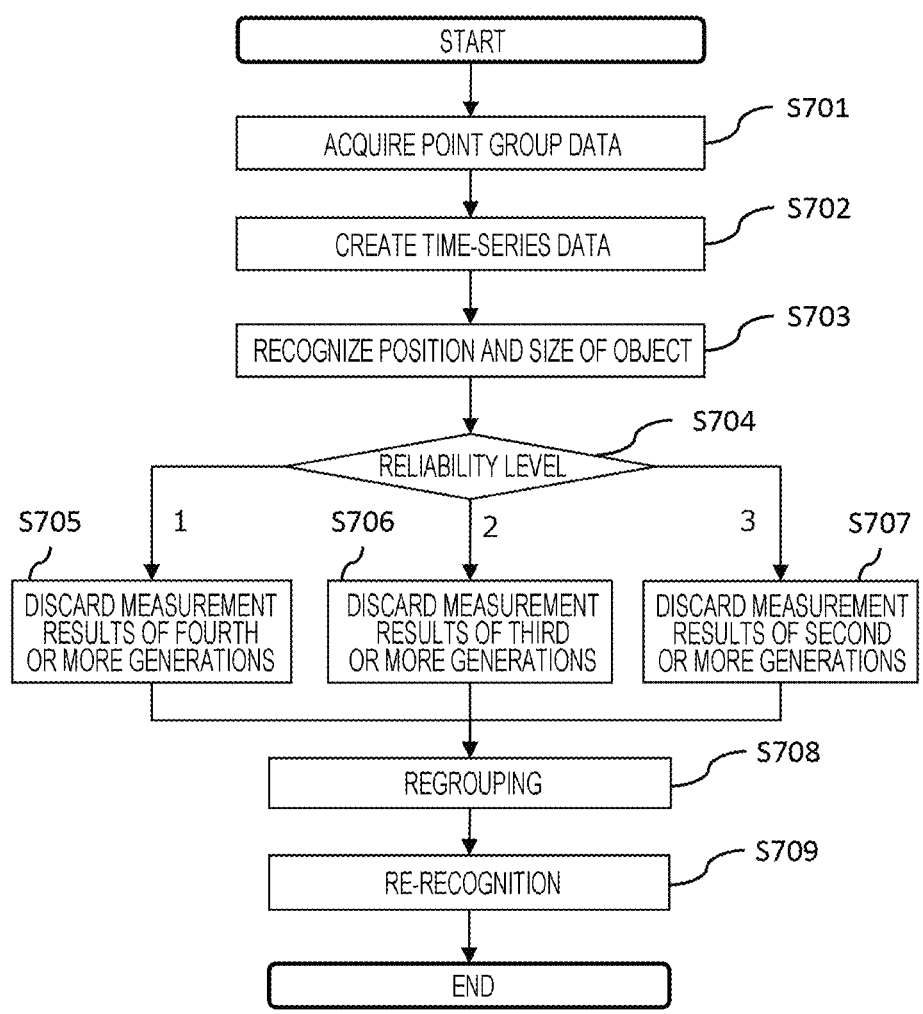
FIG. 7 is a flowchart for describing an operation of the object recognition device 100.

FIG. 7 is a flowchart for describing an operation of the object recognition device 100. The object recognition device 100 performs this flowchart, for example, every predetermined period (every time unit illustrated in FIG. 6). Hereinafter, steps of FIG. 7 will be described.

(FIG. 7: Step S701)

The measurement result acquisition unit 110 acquires the measurement results of the laser distance measurement sensor 200. The measurement result is, for example, a direction in which the laser beam is applied and the measured light intensity, or coordinates of a reflection location calculated based on the direction and light intensity. Hereinafter, the coordinates of the location at which the laser beam is reflected are handled as the measurement result for the sake of convenience in description. Thus, the measurement result is point group data corresponding to the coordinates on the grids illustrated in FIG. 2.

(FIG. 7: Step S702)

The time-series data creation unit 120 creates time-series data in which the measurement results are arranged in time series. For example, the occupancy grid map described in FIG. 4 is created as the time-series data. Hereinafter, it is assumed that the occupancy grid map is created.

(FIG. 7: Step S703)

The recognition unit 130 recognizes the position and size of the object by grouping the measurement results described by the time-series data. When the Kalman filter is used, the recognition result at the next time is calculated by using the recognition result at the previous time, and the final recognition result is obtained by combining the result recognized by using only the measurement result.

(FIG. 7: Steps S704 to S707)

The reliability calculation unit 140 calculates the reliability of the result of the recognition unit 130 recognizing the position and size of the object, and sets the reliability level according to the reliability (S704). The time-series data creation unit 120 discards the measurement result retained by the grid according to the reliability level according to the procedure described in FIG. 6 (S705 to S707).

(FIG. 7: Steps S704 to S707: Supplement)

Even though the reliability of the recognition result of the recognition unit 130 increases with the passage of time, there is a possibility that the reliability decreases for some reason. In this case, since the measurement result is discarded according to the decreased reliability, the time for which the grid retains the measurement result may be extended depending on a value of the reliability.

(FIG. 7: Steps S708 to S709)

The recognition unit 130 regroups the positions and sizes of the objects by using the measurement results retained by the grids after the measurement result is discarded (S708). The recognition unit 130 re-recognizes the position and size of the object based on the result (S709).

First Embodiment: Conclusion

The object recognition device 100 according to the first embodiment recognizes the object by grouping the measurement results of the laser distance measurement sensor 200, calculates the reliability of the recognition result, and changes the time for retaining the measurement result according to the reliability level. Accordingly, it is possible to suppress the influence of the noise included in the measurement result of the laser distance measurement sensor 200, and it is possible to accurately recognize the position and size of the object.

Second Embodiment

Figure 8:
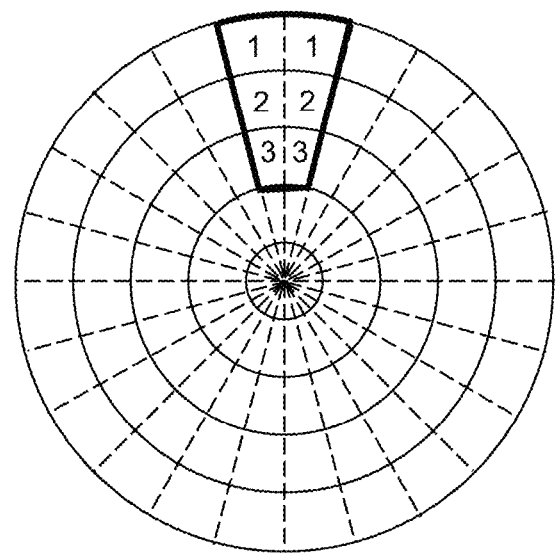
FIG. 8 is an example of time-series data created by an object recognition device 100 according to a second embodiment.

FIG. 8 is an example of the time-series data created by the object recognition device 100 according to a second embodiment of the present invention. Although it has been described in the first embodiment that the occupancy grid map described in the orthogonal coordinate system is used, the occupancy grid map can be described in a polar coordinate system as illustrated in FIG. 8. In any case, an operation procedure of the object recognition device 100 is the same.

About Modification Examples of Present Invention

The present invention is not limited to the aforementioned embodiments, and includes various modification examples. For example, the aforementioned embodiments are described in detail in order to facilitate easy understanding of the present invention, and are not limited to necessarily include all the described components. Some of the components of a certain embodiment can be substituted into the components of another embodiment, and the components of another embodiment can be added to the component of a certain embodiment. In addition, the components of another embodiment can be added, removed, and substituted to, from, and into some of the components of the aforementioned embodiments.

In addition, a part or all of the aforementioned configurations, functions, processing units, and processing means may be realized by hardware by designing an integrated circuit, for example. Each of the aforementioned configurations and functions may be realized by software by interpreting and executing a program that realizes each function by the processor. Information of programs, tables, and files for realizing the functions can be stored in a recording device such as a memory, a hard disk, or a solid state drive (SSD), or a recording medium such as an IC card, or an SD card. Furthermore, control lines and information lines illustrate lines which are considered to be necessary for the description, and not all the control lines and information lines in a product are necessarily illustrated. Almost all the configurations may be considered to be actually connected to each other.

In the aforementioned embodiments, the occupancy grid map is illustrated as the time-series data that retains the measurement results of the laser distance measurement sensor 200. It is possible to arrange the measurement results in time series by using other data formats. Even in this case, similarly, the same effects as the effects of the aforementioned embodiments can be exhibited by adjusting the time for retaining the measurement result according to the reliability level.

In the aforementioned embodiments, the example in which the variance value of the recognition result when the object is recognized by using the Kalman filter is handled as the reliability has been described. A configuration other than the Kalman filter may be adopted as long as the reliability of the recognition result can be calculated.

It has been described in the aforementioned embodiments that the position and size of the object are recognized by using the measurement result of the laser distance measurement sensor 200, it is possible to use other types of sensors in combination with the laser distance measurement sensor 200. For example, it is considered that the recognition accuracy is improved by recognizing the position and size of the object by using a radar and comparing the result with the recognition result of the laser distance measurement sensor 200.

REFERENCE SIGNS LIST 100 object recognition device
110 measurement result acquisition unit
120 time-series data creation unit
130 recognition unit
140 reliability calculation unit
150 output unit
200 laser distance measurement sensor

The invention claimed is:

1. An object recognition device that recognizes an object by using measurement results of a laser distance measurement sensor, the object recognition device comprising:
   an acquisition unit that acquires the measurement results of the laser distance measurement sensor;
   a time-series data creation unit that creates time-series data of the measurement results by arranging the measurement results in time series; and
   a recognition unit that recognizes a position and a size of the object indicated by the measurement results by grouping the measurement results described by the time-series data,
   wherein the time-series data creation unit creates the time-series data by retaining the measurement result described by the time-series data for a predetermined time and deleting the measurement result which is not updated continuously for the predetermined time or more,
   the object recognition device further includes a reliability calculation unit that calculates reliability of the position and size of the object recognized by the recognition unit, and
   the time-series data creation unit changes a time for retaining the measurement result on the time-series data according to the reliability.

2. The object recognition device according to claim 1, wherein
   the time-series data creation unit creates, as the time-series data, a time-series map of the measurement results by associating the measurement results with grid-shaped cells indicating coordinates in a space in time series, and
   the time-series data creation unit creates the time-series map by retaining the measurement results in the cells for a predetermined time and deleting the measurement result retained by the cell which is not associated with the measurement result continuously for the predetermined time or more.

3. The object recognition device according to claim 2, wherein the time-series data creation unit shortens a time for which the cell retains the measurement result in a case where the reliability is equal to or greater than a reliability threshold value compared to a case where the reliability is less than the reliability threshold value.

4. The object recognition device according to claim 2, wherein the time-series data creation unit shortens the time for which the cell retains the measurement result as the reliability becomes higher.

5. The object recognition device according to claim 3, wherein the time-series data creation unit extends the time for which the cell retains the measurement result again when the reliability is less than the reliability threshold value after the reliability is equal to or greater than the reliability threshold value.

6. The object recognition device according to claim 1, wherein
the reliability calculation unit calculates, as the reliability, a variance value of the position and size of the object recognized by the recognition unit, and
the time-series data creation unit regards the reliability as becoming higher as the variance value becomes smaller.

7. The object recognition device according to claim 6, wherein
the recognition unit obtains a first recognition result for the position and size of the object by using the recognition result previously performed, and obtains a second recognition result for the position and size of the object by using the measurement result,
the recognition unit recognizes the position and size of the object by combining the first recognition result with the second recognition result to obtain a third recognition result, and
the reliability calculation unit calculates a variance value of the third recognition result as the reliability.

8. The object recognition device according to claim 2, wherein
the recognition unit estimates a range of the object by grouping the cells which retain the measurement results and are close to each other, and
the recognition unit recognizes the position and size of the object by using the estimated range of the object.

9. The object recognition device according to claim 2, wherein the time-series data creation unit changes a time for which the cells belonging to the same group through the grouping retain the measurement results on the time-series map according to the reliability corresponding to the group.

10. The object recognition device according to claim 1, wherein the object recognition device further includes an output unit that outputs the position of the object, the size of the object, and the reliability.

11. The object recognition device according to claim 2, wherein the time-series data creation unit creates the time-series map by using an orthogonal coordinate system or a polar coordinate system.

* * * * *